United States Patent Office 2,798,096
Patented July 2, 1957

2,798,096
PRODUCTION OF CYCLIC HYDROPEROXIDES

Frederick Neil Baumgartner, Plainfield, N. J., assignor to Esso Research and Engineering Company, a corporation of Delaware No Drawing. Application February 17, 1954,
Serial No. 411,013

6 Claims. (Cl. 260—610)

This invention relates to the preparation of hydrocarbon hydroperoxides. More particularly it relates to an improved method for producing naphthene hydroperoxides. In its preferred embodiment the invention deals with the oxidation of methylcyclopentane with air in the presence of an alkali metal pyrophosphate.

In the last few years hydrocarbon hydroperoxides have been in increasing demand as polymerization catalysts and also as intermediates in the preparation of valuable oxycompounds such as ketones, phenols, alicyclic alcohols and so forth. However, many such oxidations are relatively difficult to carry out especially when it is desired to attach the oxygen to a ring carbon as distinguished from oxidation of an aliphatic side chain. For instance, not even pure oxygen will oxidize methylcyclopentane at its atmospheric boiling point in the absence of a suitable catalyst. In this connection it has been previously proposed to obtain the desired hydroperoxides by air oxidation of the corresponding naphthenic hydrocarbons in the presence of sodium carbonate and similar strongly alkaline substances. However, such previous oxidation processes produced the hydroperoxides in relatively poor yields and with poor selectivity.

It is the object of the present invention to improve the conversion of naphthenes to the corresponding hydroperoxides wherein the oxygen is attached directly to one of the carbons of the naphthene ring. A more specific object is to increase the yield of hydroperoxide in the oxidation of methylcyclopentane. Still other objects, as well as the nature of the invention, will become apparent from the following description.

It has now been discovered that the desired oxidation of naphthene rings to the corresponding hydroperoxides can be greatly improved by carrying out the oxidation in the presence of a pyrophosphate, preferably a dilute aqueous solution of an alkali metal pyrophosphate.

This invention is applicable to substituted naphthenic compounds having at least one tertiary carbon, that is, at least one CH group, directly in the alicyclic nucleus. More specifically the invention is applicable to various hydrocarbon derivatives of cyclopropane, cyclobutane, cyclopentane, cyclohexane, cycloheptane, and cyclooctane, having one, two, three or more hydrocarbon substituents attached to the naphthene ring.

The substituent groups may be methyl, ethyl, propyl, isopropyl, butyl, etc. alkyl radicals as in methylcyclopentane, dimethylcyclopentanes, ethylcyclopentane, diethylcyclopentanes, etc. as well as their isomers and homologs. Similarly, alkyl substituted cyclohexanes, cycloheptanes apply. The substituent groups may also be cyclopentyl, cyclohexyl or other cycloalkyl, phenyl, naphthyl or other aryl, cresyl, toluyl or other aralkyl or condensed rings, or any combinations of the foregoing substituents. Thus the invention can be applied to phenylcyclohexane, cyclopentyl cyclopentane, dicresyl cyclohexane, naphthyl cyclohexane, tetralin, decalin, methyldecalin, and so forth, as long as the treated hydrocarbon contains an alicyclic ring containing at least one tertiary carbon atom susceptible to oxidation. However, by far the preferred and most practical reagents are methylcyclopentane and methylcyclohexane. It is preferred to react these naphthenes in concentrated form, i. e., in purities of at least 80 weight percent. However, where a high reaction rate is not essential, inert diluents such as paraffins and other inert hydrocarbons, gaseous nitrogen, and the like may also be present in the reaction zone.

The preferred oxidizing agent is air, though pure oxygen or other gases containing at least about 5 mol % of free oxygen can be used similarly. Depending on the oxidation rate of the particular hydrocarbon treated, the oxidizing agent is supplied to the reaction zone at a rate sufficient to bring about the desired oxidation. For instance, in the case of methylcyclopentane or methylcyclohexane it is desirable to supply about 1 mole of oxygen per 4 to 9 moles of naphthene. Similarly, optimum oxygen/hydrocarbon ratios can be readily established in the case of other feeds falling within the scope of this invention.

The preferred catalyst is aqueous sodium pyrophosphate, $Na_4P_2O_7$, though other basic pyrophosphates such as those of potassium, ammonium, or calcium can be used similarly. It is preferred to use the pyrophosphate as an aqueous solution containing about 0.5 to 20 weight percent, or preferably about 5 to 15 weight percent of the pyrophosphate based on the total weight of the aqueous solution. However, the hydrated solid or anhydrous pyrophosphate is similarly effective in a batch operation. And solid pyrophosphate may be used even in a continuous process, provided that a convenient arrangement is available for replenishing the supply of the solid catalyst in the pressurized reaction zone. The total amount of pyrophosphate added to the reaction mixture should amount to about 0.1 to 2 mol percent, preferably about 0.5 to 1.0 mol percent based on the oxidizable hydrocarbon.

The reaction is best carried out at temperatures between about 110 to 150° C., preferably at 120 to 130° C. and at 80 to 100 p. s. i. g. in the case of methylcyclopentane. Obviously, the optimum temperature in each case will depend somewhat on the particular hydrocarbon being converted. The reaction pressure is kept high enough to keep the hydrocarbon feed in liquid phase. This may require pressures of about 50 to 150 p. s. i. g., depending on the nature of the hydrocarbon feed and the selected reaction temperature.

In addition to the main reagents it is also desirable to add an initiator to the reaction mixture so as to eliminate or minimize the induction period which is otherwise characteristic of this type of oxidation. Suitable initiators are various organic peroxides or hydroperoxides produced by oxidation of naphthenes such as cyclopentane, or benzoyl peroxide, cumene hydroperoxide, t-butyl hydroperoxide and other well-known materials of this type. The amount of such initiators used may range from about 0.01 to 5 weight percent, preferably 0.2 to 1 weight percent based on the oxidizable hydrocarbon feed. Of course, sometimes it may be advantageous to add still greater concentrations of initiator. For instance, some of the reaction product may be recycled to the conversion stage after recovery of a substantial portion of the desired hydroperoxide therefrom. In order to obtain the full benefits of the invention, it is desirable to convert at least 8% of the naphthenic feed in any given run, conversions between about 15 and 25% being particularly advantageous in the case of methylcyclopentane or methylcyclohexane.

A typical embodiment of the invention and its advantages over the prior art are illustrated in the following example:

EXAMPLE 1

Methylcyclopentane, about 99% pure, was oxidized in four different runs which differed from each other only in the nature of the added component as indicated in Table I below. In each case 500 ml. of methylcyclopentane and 3 ml. of 70% cumene hydroperoxide were charged to a 1-liter stainless steel stirred autoclave, together with 100 ml. of the indicated aqueous phase, except in run 1 where no aqueous phase was added. Considering that the molecular weight of sodium carbonate is 106, that of sodium pyrophosphate is 266, and that of methylcyclopentane is 84, it will be noted that in both cases where one of the sodium compounds was added, its concentration was 3.17 mole percent based on the methylcyclopentane feed. The autoclave was equipped with a single orifice bubbler, and a condenser was placed between the autoclave and the pressure regulator. The condenser was kept at a temperature of about 5° C. so as to trap out condensable gases, notably methylcyclopentane.

The reaction in each case was carried out at a pressure of 90 p. s. i. g. and a temperature of 130° C. The reaction was started by beginning to feed air when the temperature of the reaction mixture reached 130° C. The air feed rate was maintained throughout each run at 120 cc./min. measured at reaction conditions.

The progress of each reaction as well as the relation of yield to conversion is shown in Table I.

Table I

| Added Component | Time, Hrs. | Hydroperoxide Yield, g./100 cc. feed | Percent Conversion | Percent $CO_2$ In Off-Gas |
|---|---|---|---|---|
| None (Anhydrous) | 1 | 1.2 | 4 | 0.0 |
| | 2 | 2.7 | 6 | 0.3 |
| | 2.5 | 3.5 | 8 | 0.8 |
| | 4 | 0.0 | 38 | 2.6 |
| Water | 2 | 1.6 | 9 | 1.2 |
| 4% $Na_2CO_3$ aq | 2 | 2.0 | 7 | 0.8 |
| | 3.75 | 3.2 | 17 | 2.7 |
| | 2 | 2.3 | 7 | 0.4 |
| 10% $Na_4P_2O_7$ aq | 2.75 | 3.7 | 8 | 1.0 |
| | 3.75 | 4.4 | 17 | 1.8 |
| | 4.75 | 4.9 | 20 | 2.6 |

The peroxide yield was determined by the potassium iodide-glacial acetic acid method, titrating with sodium thiosulfate. Conversions were determined by treating a sample of the oxidation product with concentrated sulfuric acid at room temperature, whereby all oxygenated compounds were dissolved. A correction was made, of course, for the solubility of the initial hydrocarbon feed.

In the anhydrous system it has been found that the maximum yield of hydroperoxide is about 3.5 weight percent, and further oxidation causes decomposition of the hydroperoxide formed earlier. No such maximum was observed with oxidations in the presence of the dilute alkaline solutions proposed by the prior art, such as sodium carbonate. However, the effect of these known "catalysts" is to slow down the initial stages of the reaction, and to impair its selectivity. Thus it can be seen that where a 3.5% yield of hydroperoxide was reached in the anhydrous run after about 2.5 hours and at a conversion of about 8%, the same yield of hydroperoxide is reached only after about 4 hours, and at a conversion of almost 20%, in the presence of sodium carbonate. Consequently, the yield advantage due to the effect of the previously used alkaline solutions is obtained only at the cost of a greatly increased reaction time and with a considerable loss of feed due to the formation of increased amounts of undesirable by-products.

In contrast, when pyrophosphate is used in accordance with the present invention the hydroperoxide yield increases rather suddenly at conversions above about 7%. Thus, a 3.5% yield can be reached in the present invention in substantially the same short time as in the anhydrous run, and the selectivity is very much better than in the sodium carbonate run. By increasing the reaction time to about 3.5 hours and the conversion to about 15%, the hydroperoxide yield can be increased to about 4.5%. This represents an increase in hydroperoxide yield of about 50% over the yields obtainable at the same conversion in the presence of sodium carbonate. Still higher yields can of course be obtained by going to higher conversions.

In working up the oxidation product, the oxidation mixture may be distilled, or preferably steam distilled. It is generally desirable in such distillations to keep the pot temperature below about 100° C., as otherwise the peroxides may tend to explode. By such distillation a bottoms product containing 80 to 90 weight percent of the desired peroxide can be readily obtained, the remainder of such a concentrate consisting essentially of unconverted feed and small amounts of alcohols, as well as some ketones, acids, and other by-products.

As an alternative, where the peroxide is not desired as such, but represents only an intermediate product, the crude oxygenated product can be treated with sulfur dioxide, sulfuric acid, ferrous sulfate, or the like, to produce the desired end product. For instance, when crude methylcyclopentane hydroperoxide is treated in this manner, it can be readily converted to methyl-n-butyl ketone. Or this same treatment can be applied to a peroxide concentrate instead of the crude oxidation product.

Having described the general nature of the invention and illustrated it by specific examples, it will be understood that the scope hereof is not necessarily limited thereto except as particularly pointed out in the appended claims.

I claim:

1. A process for producing a hydroperoxide by incomplete oxidation of $C_1$–$C_4$ alkyl substituted cyclopentane which comprises introducing said alkyl cyclopentane in a purity of at least 80 weight percent into a reaction zone, also adding to said reaction zone an aqueous solution containing about 0.1 to 2 mol percent based on the amount of said hydrocarbon of a pyrophosphate of an ion of the group consisting of sodium, potassium, ammonium and calcium, maintaining the resulting liquid mixture at an oxidation temperature between about 110° and 150° C. and a pressure sufficient to maintain said hydrocarbon in liquid phase, passing an oxygen-containing gas through said reaction mixture until at least 8 percent of said mixture is converted, and recovering oxidation products from the converted reaction mixture.

2. A process according to claim 1 wherein the $C_1$–$C_4$ alkyl substituted cyclopentane is methylcyclopentane.

3. A process according to claim 1 wherein the pyrophosphate is added in the form of a dilute aqueous solution having a concentration of 0.5 to 20 weight percent.

4. A process according to claim 1 wherein the initial reaction mixture also contains an initiating amount of an organic peroxide.

5. A process for producing a hydroperoxide which comprises introducing methylcyclopentane in a purity of at least 80 weight percent into a reaction zone, also adding to said reaction zone about 0.2 to 1 weight percent of cumene hydroperoxide and 0.5 to 1 mol percent of a catalyst consisting essentially of sodium pyrophosphate, based on the methylcyclopentane, the pyrophosphate being in the form of a dilute aqueous solution having a concentration of about 5 to 15 weight percent, maintaining the resulting reaction mixture at a temperature of about 120 to 130° C. and at a pressure of about 80 to 100 p. s. i. g., passing air through the hot mixture at a rate corresponding to about 1 mol of oxygen per 4 to 9 moles of methylcyclopentane until about 15 to 25 percent of the methylcyclopentane feed is converted, and recovering methylcyclopentane hydroperoxide from the oxygenated reaction mixture.

6. A process according to claim 5 wherein a hydroperoxide concentrate is recovered from the oxygenated reaction mixture by steam distilling unconverted feed and volatile by-products therefrom.

References Cited in the file of this patent

UNITED STATES PATENTS

| | | |
|---|---|---|
| 2,084,511 | Small | June 22, 1937 |
| 2,430,865 | Farkas et al. | Nov. 18, 1947 |
| 2,575,014 | Hawkins | Nov. 13, 1951 |
| 2,632,772 | Armstrong et al. | Mar. 24, 1953 |
| 2,671,809 | Fortuin et al. | Mar. 9, 1954 |

FOREIGN PATENTS

| | | |
|---|---|---|
| 700,546 | Great Britain | Dec. 2, 1953 |

OTHER REFERENCES

Hawkins et al.: Jour. Chem. Soc. (1950), pp. 2804–8 (5 pp.).